United States Patent
Grestenberger et al.

(10) Patent No.: US 9,096,752 B2
(45) Date of Patent: Aug. 4, 2015

(54) HETEROPHASIC SYSTEM WITH IMPROVED SURFACE PROPERTIES

(75) Inventors: Georg Grestenberger, St. Peter in der Au (AT); Christelle Grein, Linz (AT); Cornelia Kock, Pucking (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/238,701

(22) PCT Filed: Aug. 14, 2012

(86) PCT No.: PCT/EP2012/065890
§ 371 (c)(1),
(2), (4) Date: Apr. 7, 2014

(87) PCT Pub. No.: WO2013/026745
PCT Pub. Date: Feb. 28, 2013

(65) Prior Publication Data
US 2014/0303308 A1    Oct. 9, 2014

(30) Foreign Application Priority Data
Aug. 19, 2011  (EP) ..................................... 11178113

(51) Int. Cl.
*C08L 23/10*  (2006.01)
*C08L 23/06*  (2006.01)
*C08L 23/14*  (2006.01)

(52) U.S. Cl.
CPC ................. *C08L 23/14* (2013.01); *C08L 23/10* (2013.01); *C08L 23/06* (2013.01); *C08L 2205/025* (2013.01); *C08L 2205/03* (2013.01); *C08L 2207/02* (2013.01); *C08L 2207/04* (2013.01)

(58) Field of Classification Search
CPC ......... C08L 23/14; C08L 23/10; C08L 23/06; C08L 2205/025; C08L 2205/03; C08L 2207/02; C08L 2205/04
USPC .................................... 525/191, 240; 524/528
See application file for complete search history.

(56) References Cited

U.S. PATENT DOCUMENTS

| 6,201,078 B1 * | 3/2001 | Breulet et al. ................. 526/113 |
| 8,450,416 B2 * | 5/2013 | Gahleitner et al. ......... 525/92 G |
| 2004/0014891 A1 | 1/2004 | Krabbenborg et al. |

FOREIGN PATENT DOCUMENTS

| CN | 1649914 A | 8/2005 |
| JP | 11130923 A | 5/1999 |
| WO | 0222731 A2 | 3/2002 |
| WO | 2004000899 A1 | 12/2003 |
| WO | 2010115878 A1 | 10/2010 |

OTHER PUBLICATIONS

Thomas Koch, et al. "Evaluation of scratch resistance in multiphase PP blends", Polymer Testing 26 (2007) 927-936.

* cited by examiner

*Primary Examiner* — Nathan M Nutter
(74) *Attorney, Agent, or Firm* — Tarolli, Sundheim, Covell & Tummino LLP

(57) ABSTRACT

The present invention relates to a polyolefin composition comprising a heterophasic propylene copolymer having a $MFR_2$ of at least 5 g/10 min and a polyethylene (PE) having a density of at least 935 kg/m³ and a melt flow rate MFR5 (190° C.) of less than 1.5 g/10 min.5

15 Claims, No Drawings

HETEROPHASIC SYSTEM WITH IMPROVED SURFACE PROPERTIES

The present invention relates to a new polyolefin composition comprising a heterophasic propylene copolymer and a polyethylene. The present invention also relates to an article comprising the said polyolefin composition, to a process for the preparation of the polyolefin composition and to the uses thereof.

Polypropylene is the material of choice in many applications as it can be tailored to specific purposes needed. For instance heterophasic polypropylenes are widely used in the automobile industry (for instance in bumper applications) as they combine good stiffness with reasonable impact strength behavior. Heterophasic polypropylenes contain a polypropylene matrix in which an amorphous phase is dispersed. The amorphous phase contains a propylene copolymer rubber, like an ethylene propylene rubber (EPR) or an ethylene propylene diene monomer polymer (EPDM). Further the heterophasic polypropylene contains a crystalline polyethylene to some extent. In the automobile industry such heterophasic polypropylene grades contain an amount of about 30 wt.-% propylene copolymer rubber, which normally is produced directly in one or two gas phase reactors or added externally to the matrix via a compounding step.

Injection molded parts are widely used in the automotive field. Automotive interior parts like dashboards, door claddings, trims etc. are commonly made from polymers. Especially propylene based resins are widely used for these applications. Such parts often try to mimic a leather- or fabric-like surface and touch in order to give occupants a high-quality impression of the car. As a result materials used should provide a low surface gloss level and good haptics. The automotive industry especially asks for a good balance of mechanical performance and superior surface characteristic. In particular, formulations showing high impact strength, high scratch resistance and low gloss at reasonable stiffness are highly desired. Thus, additionally to maintaining the high-quality perception of the parts till the end of the car's lifetime the polymer should provide a high resistance to scratches e.g. from keys, fingernails, rings etc.

Due to the compared to metals low stiffness and surface hardness of polymers they are much more prone to scratches. Therefore apart from material design and filler addition usually additives are used to overcome this drawback. It is known to people skilled in the art that scratch resistance of impact polypropylene/talc compounds can be improved by the addition of slip agents. Slip agents like fatty acid amides (Erucamide, Oleamide, Stearamide, Behenamide etc.) reduce the coefficient of friction of polymeric surfaces by migrating from the bulk to the surface. Furthermore the addition of polyethylenes with defined density and molecular weight to improve the surface durability of polypropylene compounds, as described e.g. in WO 2007/139622, WO 02/22731A2, or WO 2005/111145A1, affects the morphology of the dispersed rubber phase stabilizing the surface and immediate subsurface layer of injection moldings.

In combination both mechanisms lead to very cost efficient scratch resistant material formulations. However apart from high scratch resistance a low gloss and a balanced mechanical performance is required for automotive interior applications. None or only one of the latter two features is considered in the available prior art. Hence, a simple solution that provides balanced mechanics and balanced surface properties at once is highly desired.

Thus, the object of the present invention is the provision of a modified heterophasic polypropylene being featured by good impact performance and surface properties on the one hand, and also a high modulus on the other hand.

The present inventors have surprisingly found that polyethylene (PE) with a high density and a low melt flow rate (MFR) can improve both impact performance and surface properties while maintaining the modulus of the material at high level. The polyethylene typically has a high molecular weight and is preferably bimodal or multimodal. In particular the herein claimed composition utilizes polyethylene grades that combine a high toughening potential with a high modulus and scratch resistance and a low surface gloss.

In a first aspect, the present invention relates to a polyolefin composition (PO) comprising
(a) a heterophasic propylene copolymer (HECO) comprising
   (a1) a polypropylene (PP), and
   (a2) an elastomeric propylene copolymer (E),
      wherein the heterophasic propylene copolymer (HECO) has a melt flow rate $MFR_2$ (230° C.) of at least 5 g/10 min, and
(b) a polyethylene (PE) having a density of at least 935 kg/m$^3$, and a melt flow rate $MFR_5$ (190° C.) of less than 1.5 g/10 min.

Optionally the polyolefin composition comprises an inorganic filler (F).

The present invention further relates to an article comprising the above polyolefin composition (PO). The article is preferably an automotive article.

A further aspect of the present invention is a process for the preparation of the above polyolefin composition (PO) extruding the heterophasic propylene copolymer (HECO), the polyethylene (PE), and optionally the inorganic filler (F) in an extruder.

The present invention also relates to the use of a polyethylene (PE) having a density of at least 935 kg/m$^3$, and a melt flow rate $MFR_5$ (190° C.) of less than 1.5 g/10 min in a heterophasic propylene copolymer (HECO) for the provision of an article, preferably an automotive article, having a gloss at 60° which is at least 10% lower than the gloss at 60° of an article made using the same heterophasic propylene copolymer (HECO) but without the polyethylene (PE).

Further preferred embodiments of the present invention are described in the appended claims.

In the following the invention will be described in more detail below.

The polyolefin composition (PO) of the present invention comprises in a preferred embodiment
(a) at least 50 wt.-%, like at least 60 wt.-%, more preferably 50 to 90 wt.-%, still more preferably 60 to 80 wt.-%, of the heterophasic propylene copolymer (HECO);
(b) at least 5 wt.-%, like at least 10 wt.-%, more preferably 10 to 30 wt.-%, yet more preferably 12 to 20 wt.-%, of the polyethylene (PE); and
(c) optionally at least 3 wt.-%, like at least 5 wt.-%, more preferably 5 to 30 wt.-%, yet more preferably 7 to 25 wt.-%, of the inorganic filler (F).
based on the total polyolefin composition (PO), preferably based on the total amount of polymers present in the polyolefin composition (PO) and inorganic filler (F), more preferably based on the heterophasic propylene copolymer (HECO), the polyethylene (PE) and the inorganic filler (F).

Preferably the polyolefin composition (PO) does not contain a linear low density polyethylene. More preferably the polyethylene (PE) is the only polyethylene in the polyolefin composition (PO). In another preferred embodiment the polyolefin composition (PO) comprises the heterophasic propylene copolymer (HECO) and the polyethylene (PE) as the only polymer components.

Further it is appreciated that the polyethylene (PE) is in rather high amounts present in the polyolefin composition. Accordingly it is preferred that the weight ratio of elastomeric propylene copolymer (E) to the polyethylene (PE) [(E)/(PE)] is below 2.0, more preferably below 1.8, still more preferably in the range of 1.0 to 2.0, yet more preferably in the range of 1.2 to 1.8, still yet more preferably in the range of 1.2 to below 1.6.

The melt flow rate $MFR_2$ (230° C.) of the total polyolefin composition (PO) preferably is at least 3.0 g/10 min, more preferably at least 5.0 g/10 min, still more preferably in the range of 3.0 to 20.0 g/10 min, more preferably 5.0 to 15.0 g/10 min.

As mentioned above, the polyolefin composition of the instant invention is featured by good mechanical properties. Accordingly it is preferred that the polyolefin composition (PO) has tensile modulus (ISO 527-2) of at least 1000 MPa, more preferably in the range of 1000 to 2,200 MPa, still more preferably in the range of 1,100 to 2,000 MPa and yet more preferable in the range of 1,150 to 1,800 MPa. The measuring method of the tensile modulus is defined in the example section.

Further also the impact should be rather high. Accordingly it is appreciated that the polyolefin composition (PO) has a Charpy notched impact strength (ISO 179 1eA) at 23° C. of at least 35 kJ/m$^2$, more preferably of at least 40 kJ/m$^2$, yet more preferably in the range of 45 to 90 kJ/m$^2$, still more preferably in the range of 50 to 70 kJ/m$^2$, and/or has an impact strength at −20° C. of at least 5.5 kJ/m$^2$, more preferably of at least 6.0 kJ/m$^2$, yet more preferably in the range of 6.0 to 15.0 kJ/m$^2$, still more preferably in the range of 7.0 to 13.0 kJ/m$^2$. The measuring method of the impact strength is defined in the example section.

The polyolefin composition (PO) in accordance with the present invention may be prepared by compounding the components within suitable melt mixing devices for preparing polymeric compounds, including in particular extruders, like single screw extruders as well as twin screw extruders. Other suitable melt mixing devices include planet extruders and single screw co-kneaders. Especially preferred are twin screw extruders including high intensity mixing and kneading sections. Suitable melt temperatures for preparing the compositions are in the range from 170 to 300° C., preferably in the range from 200 to 260° C.

In the following the individual components are defined in more detail.

Heterophasic Propylene Copolymer

The expression "heterophasic" as used in the instant invention indicates that the elastomeric propylene copolymer (E) is (finely) dispersed in the polypropylene (PP). In other words the polypropylene (PP) constitutes a matrix in which the elastomeric propylene copolymer (E) forms inclusions in the matrix, i.e. in the polypropylene (PP). Thus the matrix contains (finely) dispersed inclusions being not part of the matrix and said inclusions contain the elastomeric propylene copolymer (E). The term "inclusion" according to this invention shall preferably indicate that the matrix and the inclusion form different phases within the heterophasic system, said inclusions are for instance visible by high resolution microscopy, like electron microscopy or scanning force microscopy.

Further it is preferred that the heterophasic propylene copolymer (HECO) before mixed with the other components mentioned herein comprises as polymer components only the polypropylene (PP) and the elastomeric propylene copolymer (E). In other words the heterophasic propylene copolymer (HECO) may contain further additives but no other polymer in an amount exceeding 7.5 wt-%, more preferably exceeding 5 wt.-%, based on the total heterophasic propylene copolymer (HECO), more preferably based on the polymers present in the propylene copolymer (HECO). One additional polymer which may be present in such low amounts is a polyethylene which is a reaction product obtained by the preparation of the heterophasic propylene copolymer (HECO). Accordingly it is in particular appreciated that a heterophasic propylene copolymer (HECO) as defined in the instant invention contains only a polypropylene (PP), an elastomeric propylene copolymer (E) and optionally a polyethylene in amounts as mentioned in this paragraph.

Also the polyolefin composition (PO) of the present invention can be regarded as a heterophasic system. Accordingly the polypropylene (PP) of the heterophasic propylene copolymer (HECO) constitutes also the matrix of the overall polyolefin composition (PO). The elastomeric propylene copolymer (E) and the polyethylene (PE), and optionally also the inorganic filler (F) are (finely) dispersed in said matrix. Thereby the elastomeric propylene copolymer (E) and the polyethylene (PE) may form separate inclusions in the matrix, i.e. in the polypropylene (PP) or the polyethylene (PE) may form an inclusion within the inclusion of the elastomeric propylene copolymer (E).

The heterophasic propylene copolymer (HECO) has a melt flow rate $MFR_2$ (230° C.) of at least 5 g/10 min, more preferably in the range of 5 to 40 g/10 min, still more preferably in the range of 8.0 to 25.0 g/10 min, yet more preferably in the range of 10 to 20 g/10 min.

Preferably it is desired that the heterophasic propylene copolymer (HECO) is thermo mechanically stable. Accordingly it is appreciated that the heterophasic propylene copolymer (HECO) has a melting temperature ($T_m$) of at least 135° C., more preferably in the range of 135 to 170° C., yet more preferably in the range of 145 to 168° C.

Preferably the propylene content in the heterophasic propylene copolymer (HECO) is 75.0 to 95.0 wt.-%, more preferably 80.0 to 90.0 wt.-%, based on the total heterophasic propylene copolymer (HECO), more preferably based on the amount of the polymer components of the heterophasic propylene copolymer (HECO), yet more preferably based on the amount of the polypropylene (PP) and the elastomeric propylene copolymer (E) together. The remaining part constitutes the comonomers as defined for the polypropylene (PP) being a random propylene copolymer (R-PP) and the elastomeric propylene copolymer (E), respectively, preferably ethylene. Accordingly the comonomer content, preferably ethylene content, is in the range of 5.0 to 25.0 wt.-%, more preferably in the range of 10.0 to 20.0 wt.-%.

As stated above the matrix of the heterophasic propylene copolymer (HECO) is the polypropylene (PP).

The polypropylene (PP) according to this invention has preferably a melt flow rate $MFR_2$ (230° C.) of 20 to 100 g/10 min, preferably in the range of 30 to 80 g/10 min.

Accordingly it is preferred that the polypropylene (PP) has a weight average molecular weight ($M_w$) from 100,000 to 350,000 g/mol, more preferably from 150,000 to 300,000 g/mol.

A broad molecular weight distribution (MWD) improves the processability of the polypropylene. Accordingly it is appreciated that the molecular weight distribution (MWD) of the polypropylene (PP) is at least 2.8, more preferably at least 3.0, like at least 3.3 In a preferred embodiment the molecular weight distribution (MWD) is preferably between 2.8 to 10.0, still more preferably in the range of 3.0 to 8.0.

The polypropylene (PP) can be a random propylene copolymer (R-PP) or a propylene homopolymer (H-PP), the latter is preferred.

Accordingly it is appreciated that the polypropylene (PP) has a comonomer content equal or below 5.0 wt.-%, more preferably equal or below 3.0 wt.-%.

The expression propylene homopolymer used in the instant invention relates to a polypropylene that consists substantially, i.e. of more than 99.5 wt.-%, still more preferably of at least 99.7 wt.-%, like of at least 99.8 wt.-%, of propylene units. In a preferred embodiment only propylene units in the propylene homopolymer are detectable.

In case the polypropylene (PP) is a random propylene copolymer (R-PP) it comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the random propylene copolymer (R-PP) comprises, especially consists of, monomers copolymerizable with propylene from the group consisting of ethylene, 1-butene and 1-hexene. More specifically the random propylene copolymer (R-PP) comprises—apart from propylene—units derivable from ethylene and/or 1-butene. In a preferred embodiment the random propylene copolymer (R-PP) comprises units derivable from ethylene and propylene only. The comonomer content in the random propylene copolymer (R-PP) is preferably in the range of more than 0.5 to 5.0 wt.-%, still more preferably in the range of more than 0.5 to 3.0 wt.-%.

The term "random copolymer" indicates that the comonomers within the propylene copolymer (PP) are randomly distributed. The randomness defines the amount of isolated comonomer units, i.e. those which have no neighbouring comonomer units, compared to the total amount of comonomers in the polymer chain.

The polypropylene (PP) can have a xylene cold soluble content (XCS) in the range up to 6.0 wt.-%. Accordingly the polypropylene (PP) may have a xylene cold soluble content (XCS) in the range of 0.5 to 4.5 wt.-%, like 0.7 to less than 3.0 wt.-%.

One further essential component of the heterophasic propylene copolymer (HECO) is its elastomeric propylene copolymer (E).

The elastomeric propylene copolymer (E) preferably comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the elastomeric propylene copolymer (E) comprises, especially consists of, monomers copolymerizable with propylene from the group consisting of ethylene, 1-butene and 1-hexene. More specifically the elastomeric propylene copolymer (E) comprises—apart from propylene—units derivable from ethylene and/or 1-butene. Thus in an especially preferred embodiment the elastomeric propylene copolymer phase (E) comprises units derivable from ethylene and propylene only.

In case the polypropylene (PP) is a random propylene copolymer (R-PP) it is preferred that the comonomer(s) of the random propylene copolymer (R-PP) and the elastomeric propylene copolymer (E) are the same.

The properties of the elastomeric propylene copolymer phase (E) mainly influence the xylene cold soluble (XCS) content of the heterophasic propylene copolymer (HECO). Thus according to the present invention the xylene cold soluble (XCS) fraction of heterophasic propylene copolymer (HECO) is regarded as the elastomeric propylene copolymer (E) of the heterophasic propylene copolymer (HECO). In the context of the present invention, the xylene cold soluble (XCS) fraction is also referred to as "amorphous fraction".

Accordingly, the amount of the elastomeric propylene copolymer (E), i.e. of the xylene cold soluble (XCS) fraction, of the heterophasic propylene copolymer (HECO) is preferably at least 20 wt.-%, more preferably is in the range of 20 to 45 wt.-%, still more preferably in the range of 25 to 35 wt.-%. These values are based on the heterophasic propylene copolymer (HECO) and not on the polyolefin composition (PO).

Also the molecular weight of the elastomeric propylene copolymer (E) has impact on the properties of the of the heterophasic propylene copolymer (HECO). Small particles are formed in case the matrix and the elastomeric phase have similar molecular weight. Small particles are generally preferred, because this improves the overall properties of the heterophasic system. However, in the instant invention the matrix preferably has by trend a rather high melt flow rate and thus a rather low weight average molecular weight. Accordingly also the elastomeric propylene copolymer (E) should have a low weight average molecular weight in order to obtain small particles. On the other hand this would mean in the present case a severe reduction in low weight average molecular weight for the elastomeric propylene copolymer (E), which has negative impact on the mechanical properties. Accordingly the intrinsic viscosity must be carefully chosen.

Low intrinsic viscosity (IV) values reflect a low weight average molecular weight. Thus it is appreciated that the elastomeric propylene copolymer phase (E), i.e. the xylene cold soluble fraction (XCS) of the heterophasic propylene copolymer (HECO), has an intrinsic viscosity (IV) in the range of 1.5 to 3.5 dl/g, more preferably in the range of equal or more than 1.7 to equal or less than 3.0 dl/g, still more preferably in the range of equal or more than 1.8 to equal or less than 2.8 dl/g.

The comonomer content, preferably the ethylene content, within the elastomeric propylene copolymer phase (E) shall be preferably also in a specific range. Accordingly in a preferred embodiment the comonomer content, more preferably ethylene content, of the elastomeric propylene copolymer (E), i.e. of the xylene cold soluble fraction (XCS) of the heterophasic propylene copolymer (HECO), is equal or less than 50.0 wt.-%, more preferably in the range of 25.0 to 50.0 wt.-%, still more preferably in the range of 30.0 to 46.0 wt.-%. Accordingly it is appreciated that the propylene content of the elastomeric propylene copolymer (E), i.e. of the xylene cold soluble fraction (XCS) of the heterophasic propylene copolymer (HECO), is more than 50.0 wt.-%, more preferably in the range of more than 50.0 to 75.0 wt.-%, still more preferably in the range of 54.0 to 70.0 wt.-%.

As will be explained below, the heterophasic polypropylene (HECO) as well their individual components (matrix and elastomeric copolymer) can be produced by blending different polymer types, i.e. of different molecular weight and/or comonomer content. However it is preferred that the heterophasic polypropylene (HECO) as well their individual components (matrix and elastomeric copolymer) are produced in a sequential step process, using reactors in serial configuration and operating at different reaction conditions. As a consequence, each fraction prepared in a specific reactor will have its own molecular weight distribution and/or comonomer content distribution.

The heterophasic propylene copolymer (HECO) according to this invention is preferably produced in a sequential polymerization process, i.e. in a multistage process, known in the art, wherein the polypropylene (PP) is produced at least in one slurry reactor, preferably in a slurry reactor and optionally in a subsequent gas phase reactor, and subsequently the elastomeric propylene copolymer (E) is produced at least in one, i.e. one or two, gas phase reactor(s).

Accordingly it is preferred that the heterophasic propylene copolymer (HECO) is produced in a sequential polymerization process comprising the steps of (a) polymerizing propylene and optionally at least one ethylene and/or $C_4$ to $C_{12}$ α-olefin in a first reactor (R1) obtaining the first polypropylene (PP), preferably said first polypropylene fraction is a first propylene homopolymer, (b) transferring the first polypropylene fraction into a second reactor (R2), (c) polymerizing in the second reactor (R2) and in the presence of said first polypropylene fraction propylene and optionally at least one ethylene and/or $C_4$ to $C_{12}$ α-olefin obtaining thereby the second polypropylene fraction, preferably said second polypropylene fraction is a second propylene homopolymer, said first polypropylene fraction and said second polypropylene fraction form the polypropylene (PP), i.e. the matrix of the heterophasic propylene copolymer (HECO), (d) transferring the polypropylene (PP) of step (c) into a third reactor (R3), (e) polymerizing in the third reactor (R3) and in the presence of the polypropylene (PP) obtained in step (c) propylene and at least one ethylene and/or $C_4$ to $C_{12}$ α-olefin obtaining thereby a first elastomeric propylene copolymer fraction, the first elastomeric propylene copolymer fraction is dispersed in the polypropylene (PP), (f) transferring the polypropylene (PP) in which the first elastomeric propylene copolymer fraction is dispersed in a fourth reactor (R4), and (g) polymerizing in the fourth reactor (R4) and in the presence of the mixture obtained in step (e) propylene and at least one ethylene and/or $C_4$ to $C_{12}$ α-olefin obtaining thereby the second elastomeric propylene copolymer fraction, the polypropylene (PP), the first elastomeric propylene copolymer fraction, and the second elastomeric propylene copolymer fraction form the heterophasic propylene copolymer (HECO).

Of course, in the first reactor (R1) the second polypropylene fraction can be produced and in the second reactor (R2) the first polypropylene fraction can be obtained. The same holds true for the elastomeric propylene copolymer phase. Accordingly in the third reactor (R3) the second elastomeric propylene copolymer fraction can be produced whereas in the fourth reactor (R4) the first elastomeric propylene copolymer fraction is made.

Preferably between the second reactor (R2) and the third reactor (R3) and optionally between the third reactor (R3) and fourth reactor (R4) the monomers are flashed out.

The term "sequential polymerization process" indicates that the heterophasic propylene copolymer (HECO) is produced in at least two, like three or four reactors connected in series. Accordingly the present process comprises at least a first reactor (R1) and a second reactor (R2), more preferably a first reactor (R1), a second reactor (R2), a third reactor (R3) and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer.

According to the present invention the slurry reactor (SR) is preferably a (bulk) loop reactor (LR).

The second reactor (R2), the third reactor (R3) and the fourth reactor (R4) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 msec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2), the third reactor (R3) and the fourth reactor (R4) are gas phase reactors (GPR). Accordingly for the instant process at least four, preferably four polymerization reactors, namely a slurry reactor (SR), like a loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO) as defined above the conditions for the first reactor (R1), i.e. the slurry reactor (SR), like a loop reactor (LR), of step (a) may be as follows:

the temperature is within the range of 50° C. to 110° C., preferably between 60° C. and 100° C., more preferably between 68 and 95° C., the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor (R3) and the fourth reactor (R4), preferably in the second gas phase reactor (GPR-2) and third gas phase reactor (GPR-3), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

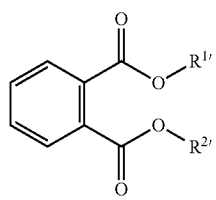

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl and n is 1 to 6, is contacting with $TiCl_4$ to form a titanized carrier, followed by the steps of
adding to said titanised carrier
  (i) a dialkylphthalate of formula (I) with $R^{1'}$ and $R^{2'}$ being independently at least a $C_5$ alkyl, like at least a $C_8$-alkyl,
  or preferably
  (ii) a dialkylphthalate of formula (I) with $R^{1'}$ and $R^{2'}$ being the same and being at least a $C_5$ alkyl, like at least a $C_8$-alkyl, or more preferably
  (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
  to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

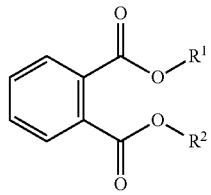

(II)

with $R^1$ and $R^2$ being methyl or ethyl, preferably ethyl, the dialkylphthalat of formula (II) being the internal donor and
recovering said transesterification product as the procatalyst composition (component (i)).

The adduct of the formula $MgCl_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the BCF20P catalyst of Borealis (prepared according to WO 92/19653 as disclosed in WO 99/24479; especially with the use of dioctylphthalate as dialkylphthalate of formula (I) according to WO 92/19658) or the catalyst Polytrack 8502, commercially available from Grace.

For the production of the heterophasic propylene copolymer (HECO) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by $$Si(OCH_3)_2R_2^5 \tag{IIIa}$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \tag{IIIb}$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor of formula (IIIb) is diethylaminotriethoxysilane.

Most preferably the external donor is of formula (IIIa), like dicyclopentyl dimethoxy silane $[Si(OCH_3)_2(cyclo-pentyl)_2]$ or diisopropyl dimethoxy silane $[Si(OCH_3)_2(CH(CH_3)_2)_2]$.

In a further embodiment, the Ziegler-Natta procatalyst can be modified by polymerizing a vinyl compound in the presence of the catalyst system, comprising the special Ziegler-Natta procatalyst (component (i)), an external donor (component (iii)) and optionally a cocatalyst (component (iii)), which vinyl compound has the formula:

$$CH_2\!=\!CH\!-\!CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

Accordingly it is appreciated that the heterophasic propylene copolymer (HECO) is α-nucleated. In case the α-nucleation is not effected by a vinylcycloalkane polymer or a vinylalkane polymer as indicated above, the following α-nucleating agents (N) may be present (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene)sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis(4,6,-di-tert-butylphenyl)phosphate or aluminium-hydroxy-bis[2,2'-methylene-bis(4,6-di-t-butylphenyl)phosphate], and (iv) mixtures thereof.

Polyethylene (PE)

According to the present invention the polyethylene (PE) must have a melt flow rate $MFR_5$ (190° C.) of less than 1.50 g/10 min, preferably 1.00 g/10 min or less, more preferably of 0.80 g/10 min or less, like 0.60 g/10 min or less. Thus it is preferred that the polyethylene (PE) must have a melt flow rate $MFR_5$ (190° C.) in the range of 0.08 to less than 1.50 g/10 min, more preferably in the range of 0.12 to 1.00 g/10 min, still more preferably in the range of 0.15 to 0.80 g/10 min.

The polyethylene (PE) is typically a high density polyethylene (HDPE). Thus it is appreciated that the polyethylene (PE) has a density of at least 935 kg/m³, such as 935 to 975 kg/m³, more preferably has a density of at least 940 kg/m³, such as 940 kg/m³ to 965 kg/m³, yet more preferably has a density of at least 943 kg/m³, such as 943 kg/m³ to 960 kg/m³.

As mentioned above the polyethylene (PE) is also dispersed in the matrix, i.e. in the polypropylene (PP), of the heterophasic propylene copolymer (HECO) and thus forming the overall polyolefin composition.

In an especially preferred embodiment, the polyethylene (PE), e.g. the high density polyethylene (HDPE), is bimodal or multimodal. More particularly, the polyethylene (PE), e.g. the high density polyethylene (HDPE), is bimodal or multimodal in view of the molecular weight distribution and/or the comonomer distribution.

Accordingly the polyethylene (PE), e.g. the high density polyethylene (HDPE), preferably comprises at least two fractions of different comonomer content and/or of different average weight molecular weight $M_w$.

Thus in a specific embodiment the polyethylene (PE), e.g. the high density polyethylene (HDPE), comprises, preferably consists of, a fraction (A) and a fraction (B), said fraction (A) has a lower comonomer content and/or a lower weight average molecular weight $M_w$ measured according to ISO 16014 than fraction (B).

Accordingly the fraction (A) is a ethylene homopolymer or a ethylene copolymer with the proviso that in case the fraction (A) is a ethylene copolymer that the comonomer content is preferably lower compared to the comonomer content of the fraction (B). In turn the fraction (B) may be also a ethylene homopolymer or alternatively a ethylene copolymer, the latter being preferred. In case the polyethylene (PE), e.g. the high density polyethylene (HDPE), i.e. the fraction (A) and/or the fraction (B), comprise(s) comonomers than it is appreciated that the comonomers are selected from the group consisting of 1-butene, 1-octene, 1-hexene and 4-methyl-penetene.

Thus the fraction (A) of the polyethylene (PE), e.g. of the high density polyethylene (HDPE), is preferably defined as follows:

It is an ethylene homopolymer oran ethylene copolymer with a comonomer, like 1-butene or 1-hexene, content of 0.5 to 3.0 wt.-%. Further it is appreciated that the weight average molecular weight $M_w$ measured according to ISO 16014 of fraction (A) ranges from 200,000 to 500,000 g/mol, more preferably from 250,000 to 400,000 g/mol. Additionally the density measured according to ISO 1183-187 of the fraction (A) is preferably higher compared to the density of fraction (B). Thus it is especially preferred that the fraction (A) has a density measured according to ISO 1183-187 in the range from 950 to 980 kg/m$^3$, more preferably from 955 to 965 kg/m$^3$.

On the other hand the fraction (B) of the polyethylene (PE), e.g. of the high density polyethylene (HDPE), is preferably defined as follows:

It is a ethylene copolymer with a comonomer, like 1-butene or 1-hexene, content of 1.5 to 6.0 wt.-%. Further it is appreciated that the weight average molecular weight $M_w$ measured according to ISO 16014 of fraction (B) ranges from 350,000 to 600,000 g/mol, more preferably from 300,000 to 500,000 g/mol. Additionally the density measured according to ISO 1183-187 of the fraction (B) may range from 920 to 950 kg/m$^3$, more preferably from 925 to 940 kg/m$^3$.

The weight ratio between the fraction (A) and the fraction (B) of the polyethylene (PE), e.g. of the high density polyethylene (HDPE), ranges from 70:30 to 30:70, more preferably 60:40 to 40:60.

The total comonomer content other than ethylene of the polyethylene (PE), e.g. of the high density polyethylene (HDPE), is preferably of 0.2 to 10 wt.-%, preferably 1.0 to 3.0 wt.-%, as measured by FTIR as defined in the example section.

The high density polyethylene (HDPE) as defined in the instant invention may be produced by blending two or more monomodal polyethylenes having differently centered maxima in their MWDs or having different comonomer content.

Alternatively and preferably the high density polyethylene (HDPE) may be produced by polymerization using conditions which create a bimodal or multimodal polymer product, using for instance a catalyst system or mixture with two or more different catalytic sites, using two or more stage polymerization process with different process conditions in the different stages (e.g. different temperatures, pressures, polymerization media, hydrogen partial pressures, comonomer content etc).

Such a high density polyethylene (HDPE) may be produced relatively simply by a multistage ethylene polymerization, e.g. using a series of reactors, with comonomer addition in only the reactor (s) used for production of the higher/highest molecular weight component (s). Examples of high density polyethylene (HDPE) production are given in EP 0 778 289 and WO 92/12182.

If an ethylene homopolymer component is produced by slurry polymerization involving use of recycled diluent, that diluent may contain small amounts of higher α-olefins as contaminants. Likewise where an earlier polymerization stage has produced an ethylene copolymer component, small amounts of comonomer may be carried over to an ethylene homo-polymerization stage.

Accordingly, by ethylene homopolymer is meant herein a polymer containing at least 99.9% by weight of ethylene units. Likewise as in a multistage/multireactor polymerization using more than one catalyst system, the homo-polymerization catalysts may be at least partially active during the copolymerization reaction, any copolymer component making up less than 5 wt.-% of the total polymer shall not be considered to be the lowest molecular weight component in an high density polyethylene (HDPE) according to the invention.

The polymerization reactions used to produce the high density polyethylene (HDPE) may involve conventional ethylene homo-polymerization or copolymerization reactions, e.g. gas-phase, slurry phase, liquid phase polymerizations, using conventional reactors, e.g. loop reactors, gas phase reactors, batch reactors etc. (see for example W0 97/44371 and W0 96/18662). The catalyst systems used may likewise be any conventional systems, e.g. chromium catalysts, Ziegler-Natta and metallocene or metallocene/aluminoxane catalysts, either homogeneous or more preferably heterogeneous catalysts, e.g. catalysts supported on inorganic or organic particulates, in particular on magnesium halides or inorganic oxides such as silica, alumina or silica-alumina. For the preparation of the high molecular weight component in particular it is especially desirable to use supported Ziegler catalysts as the molecular weight can then conveniently be controlled using hydrogen. It is also possible to use supported metallocene catalysts as it is particularly straightforward to select desired molecular weights by appropriate selection of particular metallocenes. The metallocenes used will typically be group IVa to VIa metals (in particular Zr or Hf) complexed by optionally substituted cyclopentadienyl groups, e.g. groups carrying pendant or fused substituents optionally linked together by bridging groups. Suitable metallocenes and aluminoxane cocatalysts are widely described in the literature, e.g. the patent publications of Borealis, Hoechst, Exxon, etc.

Typically and preferably however the high density polyethylene (HDPE) will be prepared using multistage polymerization using a single catalyst system or a plurality of catalyst systems, e.g. two or more metallocenes, one or more metallocenes and one or more Ziegler catalysts, two or more chromium catalysts, one or more chromium catalysts and one or more Ziegler catalysts, etc. Especially preferably the same catalyst system is used in the different polymerization stages, e. q. a catalyst system as described in EP 0 688 794.

Inorganic Filler

In addition to the polymer components the polyolefin composition (PO) may comprise an inorganic filler (F) in amounts of up to 30 wt.-%, preferably in the range of 5 to 30 wt.-%, more preferably in the range of 7 to 25 wt.-%. Preferably the inorganic filler (F) is a phyllosilicate, mica or wollastonite. Even more preferred the inorganic filler (F) is selected from the group consisting of mica, wollastonite, kaolinite, smectite, montmorillonite and talc. The most preferred the inorganic filler (F) is talc.

The mineral filler (F) preferably has a cutoff particle size d95 [mass percent] of equal or below 20 μm, more preferably in the range of 2.5 to 10 μm, like in the range of 2.5 to 8.0 μm.

Typically the inorganic filler (F) has a surface area measured according to the commonly known BET method with $N_2$ gas as analysis adsorptive of less than 22 m²/g, more preferably of less than 20 m²/g, yet more preferably of less than 18 m²/g. Inorganic fillers (F) fulfilling these requirements are preferably anisotropic mineral fillers (F), like talc, mica and wollastonite.

Further Components

The instant polyolefin composition (PO) may comprise typical additives, like acid scavengers (AS), antioxidants (AO), nucleating agents (NA), hindered amine light stabilizers (HALS), slip agents (SA), and pigments. Preferably the amount of additives excluding the inorganic filler (F) shall not exceed 7 wt.-%, more preferably shall not exceed 5 wt.-%, like not more than 3 wt.-%, within the instant composition.

Articles Made from the Polyolefin Composition (PO)

The polyolefin composition (PO) of the present invention is preferably used for the production of automotive articles, like moulded automotive articles, preferably automotive injection moulded articles. Even more preferred is the use for the production of car interiors and exteriors, like bumpers, side trims, step assists, body panels, spoilers, dashboards, interior trims and the like.

The current invention also provides (automotive) articles, like injection molded articles, comprising at least to 60 wt.-%, more preferably at least 80 wt.-%, yet more preferably at least 95 wt.-%, like consisting, of the inventive polyolefin composition (PO). Accordingly the present invention is especially directed to automotive articles, especially to car interiors and exteriors, like bumpers, side trims, step assists, body panels, spoilers, dashboards, interior trims and the like, comprising at least to 60 wt.-%, more preferably at least 80 wt.-%, yet more preferably at least 95 wt.-%, like consisting, of the inventive polyolefin composition (PO).

Uses According to the Invention

The present invention also relates to the use of a polyethylene (PE) having a density of at least 935 kg/m³, and a melt flow rate $MFR_5$ (190° C.) of less than 1.5 g/10 min in a heterophasic propylene copolymer (HECO) for reducing the gloss of said heterophasic propylene copolymer (HECO) or of the article made from the heterophasic propylene copolymer (HECO) comprising the polyethylene (PE), the improvement is determined as the gloss at 60°, wherein the gloss at 60° of the heterophasic propylene copolymer (HECO) comprising the polyethylene (PE) is at least 10% lower, preferably is 10 to 35% lower, more preferably is 12 to 30% lower, than the gloss at 60° of the same heterophasic propylene copolymer (HECO) but without the polyethylene (PE), the percentage is determined by the following formula $$\frac{G(HECO) - G(HECO + PE)}{G(HECO)} \times 100$$

wherein
G(HECO) is the gloss at 60° of the heterophasic propylene copolymer (HECO) without polyethylene (PE), and
G(HECO+PE) is the gloss at 60° of the heterophasic propylene copolymer (HECO) comprising polyethylene (PE).

That is to say, the addition of the polyethylene (PE) to the heterophasic propylene copolymer (HECO) reduces the gloss thereof, preferably without compromising other optical or mechanical properties of the heterophasic propylene copolymer (HECO). Preferred embodiments of the polyethylene (PE) and/or the heterophasic propylene copolymer (HECO) are provided above when discussing the inventive polyolefin composition (PO).

In a preferred embodiment, the claimed use further involves the following features: the heterophasic propylene copolymer (HECO) comprising the polyethylene (PE) (or articles thereof) compared to the same heterophasic propylene copolymer (HECO) without the polyethylene (PE) (or articles thereof) has (a) a scratch visibility which is at least 25% lower; more preferably 25 to 50% lower, still more preferably 30 to 45% lower, the percentage is determined by the following formula $$\frac{S(HECO) - S(HECO + PE)}{S(HECO)} \times 100$$

wherein
S(HECO) is the scratch visibility of the heterophasic propylene copolymer (HECO) without polyethylene (PE), and
S(HECO+PE) is the scratch visibility of the heterophasic propylene copolymer (HECO) comprising polyethylene (PE);

and/or (b) an impact strength at 23° C. which is at least 90% higher, more preferably 90 to 150% higher, still more preferably 95 to 130% higher, wherein the impact strength at 23° C. is measured as Charpy notched impact strength according to ISO 179 1eA at 23° C., using injection molded bar test specimens of 80×10×4 mm³ prepared in accordance with ISO 294-1:1996; the percentage is determined by the following formula $$\frac{I(HECO + PE) - I(HECO)}{I(HECO)} \times 100$$

wherein
I(HECO) is the impact strength at 23° C. of the heterophasic propylene copolymer (HECO) without polyethylene (PE), and
I(HECO+PE) is the impact strength at 23° C. of the heterophasic propylene copolymer (HECO) comprising polyethylene (PE); and/or (c) an impact strength at −20° C. which is at least 60% higher, more preferably at least 75% higher, still more preferably 60 to 120% higher, yet more preferably 75 to 120% higher, wherein the impact strength at −20° C. is measured as Charpy notched impact strength according to ISO 179 1eA at −20° C., using injection molded bar test specimens of 80×10×4 mm³ prepared in accordance with ISO 294-1: 1996, the percentage is determined by the following formula $$\frac{I(HECO + PE) - I(HECO)}{I(HECO)} \times 100$$

wherein
I(HECO) is the impact strength at −20° C. of the heterophasic propylene copolymer (HECO) without polyethylene (PE), and
I(HECO+PE) is the impact strength at −20° C. of the heterophasic propylene copolymer (HECO) comprising polyethylene (PE).

In an further preferred embodiment, the present invention relates to the use of a polyethylene (PE) having a density of at least 935 kg/m³, and a melt flow rate MFR$_5$ (190° C.) of less than 1.5 g/10 min in a heterophasic propylene copolymer (HECO) for the provision of an article, preferably an automotive article, wherein the article compared to an article made using the heterophasic propylene copolymer (HECO) without the polyethylene (PE) has the following features:

(a) a gloss at 60° which is at least 10% lower; preferably is 10 to 35% lower, more preferably is 12 to 30% lower; and/or
(b) a scratch visibility which is at least 25% lower; more preferably 25 to 50% lower, still more preferably 30 to 45% lower; and and/or
(c) an impact strength at 23° C. which is at least 90% higher, more preferably 90 to 150% higher, and/or
(d) an impact strength at −20° C. which is at least 60% higher, more preferably 60 to 120% higher.

Concerning the calculation of the percentages reference is made to the information provided above.

Preferred embodiments in the "use section" of the heterophasic propylene copolymer (HECO) comprising the polyethylene (PE) are the preferred embodiments of the polyolefin composition (PO) according to the instant invention The present invention will now be described in further detail by the examples provided below.

EXAMPLES

1. Definitions/Measuring Methods

The following definitions of terms and determination methods apply for the above general description of the invention as well as to the below examples unless otherwise defined.

Scratch Visibility

To determine the scratch visibility a Cross Hatch Cutter Model 420P, manufactured by Erichsen, was used. For the tests, plaques of 70×70×4 mm size were cut from a moulded grained (grain parameters: average grain size=1 mm, grain depth=0.12 mm, conicity=6°) plaque of size 140×200×4 mm. The minimum period between injection moulding of specimens and scratch-testing was 7 days. For testing the specimens must be clamped in a suitable apparatus as described above. Scratches were applied at a force of 10 N using a cylindrical metal pen with a ball shaped end (radius=0.5 mm±0.01). A cutting speed of 1000 mm/min was used. A minimum of 20 scratches parallel to each other were brought up at a load of 10 N with a distance of 2 mm. The application of the scratches was repeated perpendicular to each other, so that the result was a scratching screen. The scratching direction should be unidirectional.

The scratch visibility is reported as the difference of the luminance ΔL of the unscratched from the scratched areas. ΔL values were measured using a spectrophotometer that fulfils the requirements to DIN 5033. Light source for quantification of ΔL D65/10°. Measured ΔL values must be below a maximum of 1.5.

A detailed test description of the test method (Erichsen cross hatch cutter method) can be found in the article "Evaluation of scratch resistance in multiphase PP blends" by Thomas Koch and Doris Machl, published in POLYMER TESTING 26 (2007), p. 927-936. The gloss 60° was measured on injection moulded grained specimen according to DIN 67530 at an angle of 60°. The grain for gloss measurements was identical to the grain used in evaluation of scratch visibility.

NMR-spectroscopy measurements: The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the triad and pentad analysis the assignment is done according to the methods described in literature: (T. Hayashi, Y. Inoue, R. Chüjö, and T. Asakura, Polymer 29 138-43 (1988). and Chujo R, et al, Polymer 35 339 (1994). The NMR-measurement was used for determining the mmmm pentad and mm triad concentration in a manner well known in the art.

Melting temperature ($T_m$) and heat of fusion ($H_f$), crystallization temperature ($T_c$) and heat of crystallization ($H_c$): measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and heat of crystallization ($H_c$) are determined from the cooling step, while melting temperature and heat of fusion ($H_f$) are determined from the second heating step Density is measured according to ISO 1183-1—method A (2004). Sample preparation is done by compression moulding in accordance with ISO 1872-2:2007.

MFR$_2$ (230° C.) is measured according to ISO 1133 (230° C., 2.16 kg load).

MFR$_2$ (190° C.) is measured according to ISO 1133 (190° C., 2.16 kg load).

MFR$_5$ (190° C.) is measured according to ISO 1133 (190° C., 5 kg load).

Number average molecular weight ($M_n$), weight average molecular weight ($M_w$) and molecular weight distribution (MWD) are determined by Gel Permeation Chromatography (GPC) according to the following method: The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min 216.5 μL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Quantification of Comonomer Content by FTIR Spectroscopy

The comonomer content is determined by quantitative Fourier transform infrared spectroscopy (FTIR) after basic assignment calibrated via quantitative $^{13}$C nuclear magnetic resonance (NMR) spectroscopy in a manner well known in the art. Thin films are pressed to a thickness of between 100-500 μm and spectra recorded in transmission mode. Specifically, the ethylene content of a polypropylene-co-ethylene copolymer is determined using the baseline corrected peak area of the quantitative bands found at 720-722 and 730-733 cm$^{-1}$. Specifically, the butane or hexene content of a polyethylene copolymer is determined using the baseline corrected peak area of the quantitative bands found at 1377-1379 cm$^{-1}$. Quantitative results are obtained based upon reference to the film thickness.

The xylene cold solubles (XCS, wt.-%): Content of xylene cold solubles (XCS) is determined at 25° C. according ISO 16152; first edition; Jul. 1, 2005

Intrinsic viscosity is measured according to DIN ISO 1628/1, October 1999 (in Decalin at 135° C.).

Tensile Modulus; Tensile stress at yield and Tensile strain at break are measured according to ISO 527-2 (cross head speed=1 mm/min; 23° C.) using injection molded specimens as described in EN ISO 1873-2 (dog bone shape, 4 mm thickness).

Charpy impact test: The Charpy notched impact strength (Charpy NIS) is measured according to ISO 179 1eA at 23° C., −20° C., using injection molded bar test specimens of 80×10×4 mm³ mm³ prepared in accordance with ISO 294-1: 1996

Cutoff particle size d95 (Sedimentation) is calculated from the particle size distribution [mass percent] as determined by gravitational liquid sedimentation according to ISO 13317-3 (Sedigraph)

Specific surface area is determined as the BET surface according to DIN 66131/2.

2. Examples

An experimental heterophasic propylene copolymer (HECO) was produced in a Borstar polypropylene plant with a prepolymerization reactor, one slurry loop reactor and three gas phase reactors. The catalyst Polytrack 8502, commercially available from Grace (US) was used in combination with dicyclopentyl dimethoxy silane [$Si(OCH_3)_2(cyclo-pentyl)_2$] as external donor and triethylaluminium (TEAL) as activator and scavenger in the ratios indicated in table 1. The catalyst was modified by polymerising a vinyl compound in the presence of the catalyst system.

The preparation of the HECO is described in the following table 1.

TABLE 1

Preparation of the heterophasic propylene copolymer (HECO)

| Catalyst | | |
|---|---|---|
| TEA/Ti | [mol/mol] | 220 |
| TEAL/Donor | [mol/mol] | 18.69 |
| Loop | | |
| Temperature | [° C.] | 70.2 |
| $H_2/C_3$ | [mol/kmol] | 13.93 |
| $MFR_2$ | [g/10 min] | 35 |
| XCS | [wt %] | <2.0 |
| $C_2$ tot | [wt %] | no |
| 1$^{st}$ GPR | | |
| Temperature | [° C.] | 78.41 |
| $H_2/C_3$ | [mol/kmol] | 77.91 |
| $MFR_2$ | [g/10 min] | 35 |
| XCS | [wt %] | <2.0 |
| $C_2$ tot | [wt %] | no |
| 2$^{nd}$ GPR | | |
| Temperature | [° C.] | 71.32 |
| $H_2/C_2$ | [mol/kmol] | 219.02 |
| $C_2/C_3$ | [mol/kmol] | 715.53 |
| XCS | [wt %] | 20.0 |
| $C_2$ tot | [wt %] | 8.5 |
| $C_2$ of XCS | [wt %] | 42.0 |
| IV of XCS | [dl/g] | 1.6 |
| 3$^{rd}$ GPR | | |
| Temperature | [° C.] | 82.82 |
| $H_2/C_2$ | [mol/kmol] | 202.96 |
| $C_2/C_3$ | [mol/kmol] | 746.6 |
| $MFR_2$ | [g/10 min] | 13.0 |
| XCS | [wt %] | 32.0 |
| IV of XCS | [dl/g] | 1.6 |
| Tm | [° C.] | 165 |
| Split Loop/GPR1/GPR2/GPR3 | [wt %] | 32.5/34.5/21/12 |

TABLE 2

Comparative Examples

| Example* | | CE 1 | CE 2 | CE 3 | CE 4 | CE 5 | CE 6 | CE 7 |
|---|---|---|---|---|---|---|---|---|
| HECO | [wt %] | 72 | 72 | 72.3 | 72.3 | 72.3 | 72.3 | 87 |
| Talc | [wt %] | 10 | 10 | 10 | 10 | 10 | 10 | 10 |
| PE-1 | [wt %] | 15 | — | — | — | — | — | — |
| PE-2 | [wt %] | — | 15 | — | — | — | — | — |
| PE-3 | [wt %] | — | — | 15 | — | — | — | — |
| PE-4 | [wt %] | — | — | — | 15 | — | — | — |
| PE-5 | [wt %] | — | — | — | — | 15 | — | — |
| PE-6 | [wt %] | — | — | — | — | — | 15 | — |
| MFR | [g/10 min] | 9.2 | 10.2 | 8.2 | 9.4 | 9.4 | 12.3 | 13.0 |
| Scratch visibility | — | 3.71 | 4.16 | 3.01 | 2.68 | 3.38 | 2.93 | 4.37 |
| Gloss 60° | [%] | 3.3 | 3.4 | 2.0 | 2.6 | 3.4 | 3.7 | 3.2 |
| Tensile Modulus | [MPa] | 1086 | 1129 | 1211 | 1176 | 1378 | 1415 | 1588 |
| Tensile stress at yield | [MPa] | 16.1 | 16.7 | 17.5 | 17.3 | 20.2 | 20.5 | 22.0 |
| Tensile strain at break | [%] | 424 | 383 | 54 | 51 | 38 | 54 | 57 |

TABLE 2-continued

Comparative Examples

| Example* | | CE 1 | CE 2 | CE 3 | CE 4 | CE 5 | CE 6 | CE 7 |
|---|---|---|---|---|---|---|---|---|
| Impact strength +23° C. | [kJ/m$^2$] | 74.8 | 66.7 | 32.4 | 56.0 | 45.2 | 51.4 | 28.2 |
| Impact strength −20° C. | [kJ/m$^2$] | 42 | 11.5 | 3.6 | 5.6 | 4.7 | 5.2 | 4.9 |

Rest to 100 wt.-% are additives, like antioxidants and pigments (e.g. Carbon black)
"Talc" is the commercial talc Steamic T1 CA of Luzenac, having a cutoff particle size (d$_{95}$) of 6.2 μm.
"PE-1" is the commercial product Engage 8150 of Dow Elastomers having a MFR$_2$ (190° C./2.16 kg) of 0.50 g/10 min and a density of 868 kg/m$^3$,
"PE-2" is the commercial product Engage 8100 of Dow Elastomers having a MFR$_2$ (190° C./2.16 kg) of 1.0 g/10 min and a density of 870 kg/m$^3$,
"PE-3" is the commercial product FA3220 of Borealis AG having a MFR$_2$ (190° C./2.16 kg) of 0.3 g/10 min and a density of 922 kg/m$^3$,
"PE-4" is the commercial product FA5224 of Borealis AG having a MFR$_2$ (190° C./2.16 kg) of 1.2 g/10 min and a density of 922 kg/m$^3$,
"PE-5" is the commercial product VL4580 of Borealis AG having a MFR$_2$ (190° C./2.16 kg) of 0.6 g/10 min and a density of 958 kg/m$^3$,
"PE-6" is the commercial product MG9641 of Borealis AG having a MFR$_2$ (190° C./2.16 kg) of 8 g/10 min and a density of 964 kg/m$^3$,
"PE-A" is the commercial product HE3490-LS-H of Borealis AG, a bimodal polyethylene having a MFR$_5$ (190° C./2.16 kg) of 0.24 g/10 min, a density of 959 kg/m$^3$, and 2.3 wt.-% hexene
"PE-B" is the commercial product HE3490-LS of Borealis AG, a bimodal polyethylene having a MFR$_5$ (190° C./2.16 kg) of 0.24 g/10 min, a density of 959 kg/m$^3$, and 1.25 wt.-% butene

TABLE 3

Inventive Examples

| Example* | | E 1 | E 2 |
|---|---|---|---|
| HECO | [wt %] | 72.3 | 72.3 |
| Talc | [wt %] | 10 | 10 |
| PE-A | [wt %] | 15 | — |
| PE-B | [wt %] | — | 15 |
| MFR$_2$ | [g/10 min] | 7.7 | 7.9 |
| Scratch visibility | | 2.49 | 2.56 |
| Gloss 60° | [%] | 2.3 | 2.4 |
| Tensile Modulus | [MPa] | 1364 | 1367 |
| Tensile stress at yield | [MPa] | 19.2 | 19.5 |
| Tensile strain at break | [%] | 20 | 21 |
| Impact strength +23° C. | [kJ/m$^2$] | 64.8 | 59.8 |
| Impact strength −20° C. | [kJ/m$^2$] | 9.4 | 8.8 |

Rest to 100 wt.-% are additives, like antioxidants and pigments (e.g. Carbon black)

The above examples show the benefits of preferably bimodal PE with high density and low melt flow rate as impact modifier in automotive interior compounds. The inventive examples feature a similar low gloss as comparative examples C1 to C6 modified with LLDPEs at much lower scratch visibility. Furthermore the drop in modulus is far less than in case of using LLDPE as impact modifier. Although similar is true for HDPE, comparative examples C7 to C9 show a much higher gloss than the inventive examples. The impact strength of the inventive examples is superior over the comparative examples except for comparative examples C1-C3. However, the latter suffer from a very poor surface characteristic and low modulus.

The invention claimed is:

1. Polyolefin composition (PO) comprising:
   (a) a heterophasic propylene copolymer (HECO) comprising,
      (a1) a polypropylene (PP), and
      (a2) an elastomeric propylene copolymer (E),
   wherein the heterophasic propylene copolymer (HECO) has a melt flow rate MFR$_2$ (230° C.) of at least 5 g/10 min, and
   (b) a polyethylene (PE) having a density of at least 935 kg/m$^3$, and a melt flow rate MFR$_5$ (190° C.) of less than 1.5 g/10 min.

2. Polyolefin composition (PO) according to claim 1, wherein the polyethylene (PE):
   (a) is bimodal or multimodal, and/or
   (b) has a density of equal or more than 940 kg/m$^3$, and/or
   (c) has a melt flow rate MFR$_5$ (190° C.) of 1.0 g/10 min or less.

3. Polyolefin composition (PO) according to claim 1, wherein the heterophasic propylene copolymer (HECO) has:
   (a) a melt flow rate MFR$_2$ (230° C.) of 5 to 40 g/10 min, and/or
   (b) a xylene cold soluble content (XCS) of at least 20 wt. % based on the total weight of the heterophasic propylene copolymer (HECO), and/or
   (c) a comonomer content of 5.0 to 25.0 wt. % based on the total weight of the heterophasic propylene copolymer (HECO), wherein the comonomers are ethylene and/or a $C_4$ to $C_{12}$ olefin.

4. Polyolefin composition (PO) according to claim 1, wherein:
   (a) the weight ratio of elastomeric propylene copolymer (E) to the polyethylene (PE) is below 2.0; and/or
   (b) the polypropylene (PP) has a melt flow rate MFR$_2$ (230° C.) of 20 to 100 g/10 min.

5. Polyolefin composition (PO) according to claim 1, wherein the elastomeric propylene copolymer (E) has:
   (a) an intrinsic viscosity (IV) in the range of 1.0 to 3.5 dl/g, measured as the intrinsic viscosity (IV) of the xylene cold soluble (XCS) fraction of the heterophasic propylene copolymer (HECO); and/or
   (b) a comonomer content of 25.0 to 50.0 wt. %, based on the total weight of the xylene cold soluble fraction of the heterophasic propylene copolymer (HECO), wherein the comonomers are ethylene and/or a $C_4$ to $C_{12}$ olefin.

6. Polyolefin composition (PO) according to claim 1, wherein polypropylene (PP) is a propylene homopolymer (H-PP).

7. Polyolefin composition (PO) according to claim 1, wherein the polyolefin composition (PO) further comprises of an inorganic filler (F).

8. Polyolefin composition (PO) according to claim 7, wherein the inorganic filler (F) has a cutoff particle size d95 of equal or below 20 μm.

9. The polyolefin composition (PO) according to claim 1, provided in an article.

10. The polyolefin composition according to claim 9, wherein the article is an automotive article.

11. Process for the preparation of the polyolefin composition (PO) according to claim 1, comprising extruding the heterophasic propylene copolymer (HECO), the polyethylene (PE), and optionally the inorganic filler (F) in an extruder.

12. Process according to claim 11, wherein the heterophasic propylene copolymer (HECO) is obtained by producing the polypropylene (PP) in at least one reactor system, said system comprises at least one reactor, transferring said polypropylene (PP) in a subsequent reactor system, said system comprises at least one reactor, where in the presence of the polypropylene (PP) the elastomeric propylene copolymer (E) is produced.

13. A method for reducing the gloss of a heterophasic propylene copolymer (HECO) or of an article made from the heterophasic propylene copolymer (HECO) comprising providing a polyethylene (PE) having a density of at least 935 kg/m3 and a melt flow rate MFR5 (190° C.) of less than 1.5 g/10 min in a heterophasic propylene copolymer (HECO) or of an article made from the heterophasic propylene copolymer (HECO), the improvement in the gloss is determined as the gloss at 60°, wherein the gloss at 60° of the heterophasic propylene copolymer (HECO) comprising the polyethylene (PE) is at least 10% lower, than the gloss at 60° of the same heterophasic propylene copolymer (HECO) but without the polyethylene (PE), the percentage is determined by the formula:

$$\frac{G(HECO) - G(HECO + PE)}{G(HECO)} \times 100$$

wherein,
G(HECO) is the gloss at 60° of the heterophasic propylene copolymer (HECO) without polyethylene (PE), and
G(HECO+PE) is the gloss at 60° of the heterophasic propylene copolymer (HECO) comprising polyethylene (PE).

14. The method according to claim 13, wherein the heterophasic propylene copolymer (HECO) or of an article made from the heterophasic propylene copolymer (HECO) comprising the polyethylene (PE) has;
(a) a scratch visibility which is at least 25% lower than the same heterophasic propylene copolymer (HECO) but without the polyethylene (PE) or articles made therefrom, the percentage is determined by the formula:

$$\frac{S(HECO) - S(HECO + PE)}{S(HECO)} \times 100$$

wherein,
S(HECO) is the scratch visibility of the heterophasic propylene copolymer (HECO) without polyethylene (PE), and
S(HECO+PE) is the scratch visibility of the heterophasic propylene copolymer (HECO) comprising polyethylene (PE); and/or
(b) an impact strength at 23° C. which is at least 90% higher than the same heterophasic propylene copolymer (HECO) but without the polyethylene (PE) or articles made therefrom, the percentage is determined by the formula, $$\frac{I(HECO + PE) - I(HECO)}{I(HECO)} \times 100$$

wherein,
I(HECO) is the impact strength at 23° C. of the heterophasic propylene copolymer (HECO) without polyethylene (PE), and
I(HECO+PE) is the impact strength at 23° C. of the heterophasic propylene copolymer (HECO) comprising polyethylene (PE); and/or
(c) an impact strength at −20° C. which is at least 60% higher than the same heterophasic propylene copolymer (HECO) but without the polyethylene (PE) or articles made therefrom, the percentage is determined by the formula $$\frac{I(HECO + PE) - I(HECO)}{I(HECO)} \times 100$$

wherein,
I(HECO) is the impact strength at −20° C. of the heterophasic propylene copolymer (HECO) without polyethylene (PE), and
I(HECO+PE) is the impact strength at −20° C. of the heterophasic propylene copolymer (HECO) comprising polyethylene (PE).

15. The method according to claim 13, wherein the heterophasic propylene copolymer (HECO) with the polyethylene (PE) is a polyolefin composition (PO).

* * * * *